United States Patent
Hasegawa et al.

(10) Patent No.: US 6,274,943 B1
(45) Date of Patent: Aug. 14, 2001

(54) ENGINE-STARTING DISCRIMINATION SYSTEM FOR HYBRID VEHICLE

(75) Inventors: Yusuke Hasegawa; Hiroyuki Abe; Takahiro Yonekura; Yoshinobu Hasuka, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,398

(22) Filed: Dec. 17, 1999

(30) Foreign Application Priority Data

Dec. 18, 1998 (JP) .................................................. 10-361500

(51) Int. Cl.⁷ .............................. F02N 11/06; H02P 9/04
(52) U.S. Cl. .................. 290/40 C; 290/40 A; 290/40 B; 290/40 D; 290/40 E; 290/38 R
(58) Field of Search ...................... 290/38 R, 40 A–40 F, 290/38 C, 40 R; 318/139; 322/16; 180/6, 5.2–65.4, 197

(56) References Cited

U.S. PATENT DOCUMENTS

| | | | |
|---|---|---|---|
| 5,621,304 | * | 4/1997 | Kiuchi et al. ........................... 322/18 |
| 5,818,116 | * | 10/1998 | Nakae et al. ....................... 290/38 R |
| 5,939,794 | * | 8/1999 | Sakai et al. ........................ 290/40 A |
| 5,942,879 | * | 8/1999 | Ibaraki ................................... 322/16 |
| 6,064,161 | * | 5/2000 | Takahara et al. ..................... 318/139 |

FOREIGN PATENT DOCUMENTS

| | | |
|---|---|---|
| 8-74545 | 3/1996 | (JP) . |
| 8-261118 | 10/1996 | (JP) . |
| 9-117012 | 5/1997 | (JP) . |

\* cited by examiner

Primary Examiner—Elvin Enad
(74) Attorney, Agent, or Firm—Arent Fox Kintner Plotkin & Kahn, PLLC

(57) ABSTRACT

A system for discriminating engine-starting of a hybrid vehicle having an internal combustion engine and a generator-motor connected to the engine to rotate the engine to start and to be rotated to generate electric power after the engine is started. In the system, elapse of time is measured after the current command value supplied to the generator-motor becomes less than a reference value, and it is determined whether the detected engine speed is greater or equal to a combustion-completion discriminating speed after the measured time has reached a predetermined value. Then, it is determined whether the detected engine speed is determined to be greater or equal to the combustion-completion engine speed, and if it is, it is discriminated that the engine is definitely started. With the arrangement, the engine starting is discriminated in a relatively short time with highly accuracy.

12 Claims, 5 Drawing Sheets

US 6,274,943 B1

ENGINE-STARTING DISCRIMINATION SYSTEM FOR HYBRID VEHICLE

BACKGROUND OF THE INVENTION

1. Field of the Invention

This invention relates to an engine-starting discrimination system for a hybrid vehicle, more particularly to a system for discriminating whether the engine has definitely been started by a generator-motor mounted on a hybrid vehicle.

2. Description of the Related Art

Hybrid vehicles that combine a generator-motor and an internal combustion engine are of two general types: series hybrid vehicles whose wheels are driven solely by an electric motor (generator-motor) and parallel hybrid vehicles whose wheels are driven by either or both an electric motor (generator-motor) and an internal combustion engine. In this kind of vehicle, no matter whether the vehicle is a series hybrid one or a parallel hybrid one, the generator-motor is used as a starter motor to start the internal combustion engine.

In the hybrid vehicle, the engine is started automatically during vehicle running, in other words, engine starting is conducted without the vehicle operator's participation. Moreover, the generator-motor in the hybrid vehicle cranks the engine at a speed relatively higher than an ordinary starter motor and thus, the generator-motor can assist torque to start the engine at a speed close to the engine idling speed. For these reasons, it has been difficult in the hybrid vehicle to discriminate whether the engine is definitely started.

Japanese Laid-Open Patent Application No. Hei 8(1996)-261,118 teaches starting the engine by increasing the torque command value supplied to the generator-motor gradually and then decreasing the torque command value to zero so as to cancel the torque assist. The engine speed is detected and if the engine speed does not drop under this no-torque-assist situation, it is discriminated that the engine is definitely started.

Japanese Laid-Open Patent Application No. Hei 9(1997)-117,012 discloses supplying current to the generator-motor to rotate the engine to start and similarly discontinuing the torque assist when the engine speed has reached an engine idling speed or thereabout. Then the engine speed is detected after a predetermined time has elapse and if the detected engine speed is at or above a reference speed, it is discriminated that the engine is definitely started.

Since, however, the prior art system disclosed in Japanese Laid-Open Patent Application No. Hei 8(1996)-261,118, determines whether the engine is definitely started based on the engine speed after the torque assistance has been discontinued, it can not discriminate accurately whether the engine revolution is due to the successful starting or due to the inertial force created by the previous torque assistance. Thus, the prior art system can not discriminates the engine starting with high accuracy. Moreover, the prior art system is disadvantageous in fuel consumption, since it involves unnecessary cranking.

These problems will also be applied to the other prior art described in Japanese Laid-Open Patent Application No. Hei 9(1997)-117,012, since it discriminates the engine starting based on the engine speed after a predetermined time from the discontinuation of torque assistance. Moreover, since this prior art needs more time to wait the engine speed detection, the discrimination is disadvantageously delayed by the waiting time.

SUMMARY OF THE INVENTION

An object of the present invention is therefore to overcome the drawbacks explained in the foregoing by providing an engine-starting discrimination system for a hybrid vehicle having an internal combustion engine and a generator-motor connected to the engine to rotate the engine to start and to be rotated to generate electric power after the engine is started, which discriminates the engine starting in a relatively short time with high accuracy.

This invention achieves these objects by providing a system for discriminating engine-starting of a hybrid vehicle having an internal combustion engine and a generator-motor connected to the engine to rotate the engine to start and to be rotated to generate electric power after the engine is started, comprising; engine speed detecting means for detecting a speed of the engine; current command value determining means for determining a current command value necessary for rotating the engine at a desired engine-starting speed in response to an engine-starting instruction and for beginning supply of current based on the determined current command value to the generator-motor; fuel supply means for supplying fuel to the engine; time measuring means for measuring elapse of time after the current command value supplied to the generator-motor has become less than a reference value; combustion-completion determining means for determining whether the detected engine speed is greater or equal to a combustion-completion discriminating speed after the measured time has reached a predetermined value; and engine-starting discriminating means for discriminating that the engine is started when the detected engine speed is determined to be greater or equal to the combustion-completion engine speed.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

An embodiment of the present invention will now be explained with reference to the drawings.

Figure 1:
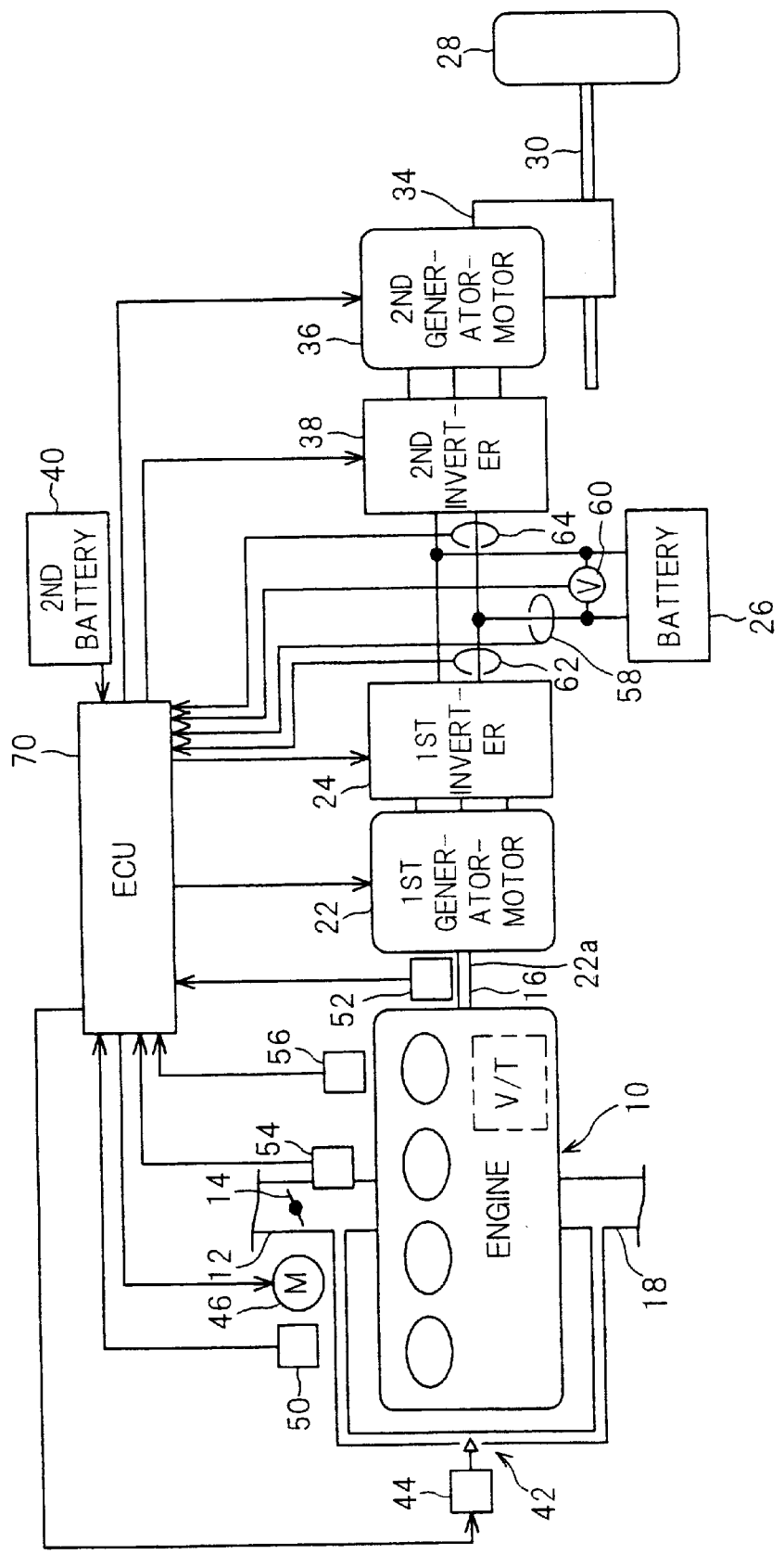
FIG. 1 is an overall schematic view showing an engine-starting discrimination system for a hybrid vehicle according to an embodiment of the invention.

FIG. 1 is an overall schematic view of an engine-starting discriminating system for a hybrid vehicle for explaining embodiments of the present invention, taking a series hybrid vehicle as an example.

Reference numeral 10 in this figure designates an OHC in-line four-cylinder internal combustion engine (hereinafter called simply "engine"). Air drawn into an air intake pipe 12 through an air cleaner (not shown) mounted on its far end is supplied to the cylinders (not shown) through a surge tank (not shown) and an intake manifold (not shown), while the flow thereof is adjusted by a throttle valve 14.

A fuel injector (not shown) for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown) to rotate a crankshaft 16.

The exhaust gas produced by the combustion is discharged through an exhaust valve (not shown) into an exhaust manifold (not shown), from where it passes through an exhaust pipe 18 to a catalytic converter (not shown) to be purified and then discharged to the exterior.

The engine 10 is connected to a first generator-motor 22. Specifically, the crankshaft of the engine 10 is coaxially connected directly to an input shaft 22a of the first generator-motor 22. The first generator-motor 22 is therefore rotated synchronously with the rotation of the engine 10.

The first generator-motor 22 is a DC brushless generator-motor and can produce approximately the same output as the engine 10. The first generator-motor 22 operates as an electric motor or a generator in response to a desired command value.

The first generator-motor 22 is connected through a first inverter 24 to a battery 26 (electrical energy storage means) installed at an appropriate place in the vehicle (not shown) equipped with the engine 10. When the first generator-motor 22 operates as a generator its output or power (generated energy) is converted to DC voltage by the first inverter 24 and the DC voltage is used to charge the battery 26.

When the first generator-motor 22 operates as an electric motor, battery discharge voltage is converted to AC by the first inverter 24 and applied to the first generator-motor 22 to rotate the engine 10. Driven wheels 28 of the vehicle (front wheels; only one shown) are connected through drive shafts 30 (only one shown) to a differential mechanism 34 whose input end is connected directly to the output shaft of a second generator-motor 36.

The second generator-motor 36 is also a DC brushless generator-motor and like the first generator-motor 22 and can also produce approximately the same output as the engine 10. The second generator-motor 36 also operates as an electric motor or generator in response to a desired command value.

The second generator-motor 36 is connected through a second inverter 38 to the battery 26. When the second generator-motor 36 operates as a generator its output or power (generated energy) is converted to DC voltage by the second inverter 38 and the DC voltage is used to charge the battery 26. When the second generator-motor 36 operates as an electric motor, battery discharge voltage is converted to AC by the second inverter 38 and applied to the second generator-motor 36 to rotate the drive wheels 28 and propel the vehicle.

The vehicle is thus constituted as a series hybrid vehicle that rotates the wheels solely by the output of the second generator-motor 36. In the series hybrid vehicle of this embodiment, the input required by the second generator-motor 36 (the required electric power) is determined (calculated) in real time based on the operating condition of the vehicle and the determined (calculated) required input is basically supplied solely by the first generator-motor 22 having substantially the same output capability as the engine 10.

While this is the basic operation, exceptions arise because the engine 10 is operated intermittently. Specifically, in the high-load region it is operated at the high-efficiency point where the BSFC is optimum, i.e., at the point of minimum fuel consumption, and is stopped in the low-load region. When the engine 10 is stopped and the first generator-motor 22 therefore produces no output, the input required by the second generator-motor 36 is supplied by the battery 26.

The battery 26 need only be capable of output of power during intermittent operation and input/output of power during regeneration. It can therefore be a battery of relatively small capacity capable of providing voltage on the level commonly used in electric vehicles (200 V–300 V). A second on-board battery 40 of around 12 V is provided separately of the battery 26 at an appropriate place on the engine 10 for supplying power to an Electronic Control Unit (ECU) 70 and other electrical components.

The engine 10 is equipped with an EGR system 42 that uses a bypass to return part of the exhaust gas from the exhaust pipe 18 to the air intake pipe 12. The EGR rate is adjusted by an EGR control valve 44. The engine 10 is also equipped with a variable valve timing system (denoted as V/T in FIG. 1) that varies the opening/closing times and the lifts (including rest operation) of the intake and exhaust valves. As the variable valve timing system V/T is described in Japanese Laid-Open Patent Application No. Hei 8(1996)-74,545, for example, it will not be described further here.

The throttle valve 14 is not mechanically linked with an accelerator pedal (not shown) located on the floor of the vehicle near the vehicle operator's seat but is connected with, and opened/closed by a stepping motor 46. A throttle position sensor 50 is connected with the stepping motor 46 and, based on the amount of rotation of the stepping motor, outputs a signal representing the opening of the throttle valve 14 (throttle opening A crank angle sensor 52 installed in the vicinity of the crankshaft 16 of the engine 10 outputs a signal representing the piston crank angles and a manifold absolute pressure sensor 54 provided in the air intake pipe 12 downstream of the throttle valve 14 outputs a signal representing the absolute manifold pressure (indicative of engine load) PBA. A coolant temperature sensor 56 provided at an appropriate place in a coolant water passage (not shown) of the engine 10 outputs a signal representing the engine coolant temperature TW.

A current sensor 58 and a voltage sensor 60 incorporated in an input /output circuit of the battery 26 output signals proportional to the input/output current and voltage of the battery 26. Current sensors 62 and 64 incorporated in input/output circuits of the first generator-motor 22 and the second generator-motor 36 output signals proportional to the respective input/output currents.

The outputs of the sensors are sent to the ECU 70. The ECU 70, which comprises a microcomputer, controls the operation of, among others, the engine 10, the first generator-motor 22 and the second generator-motor 36 based on the sensor outputs.

Explaining briefly the operation of the first generator-motor 22, in particular the motor operation. The first generator-motor 22 is subject to velocity feedback to assist torque for starting the engine 10. Specifically, a current command value (primary current command value) ICMD to be supplied to the first generator-motor is determined in such a way that the deviation or error between the detected engine speed (obtained through the crank angle sensor 52) NE and a desired engine-starting speed NSTS (e.g., 700 rpm; explained later) decreases, and based on the determined current command value ICMD, the current is supplied to the first generator-motor 22 to rotate the engine 10, as will be explained below.

This operation of the engine-starting discrimination system for the hybrid vehicle according to this embodiment will now be explained.

Figure 2:
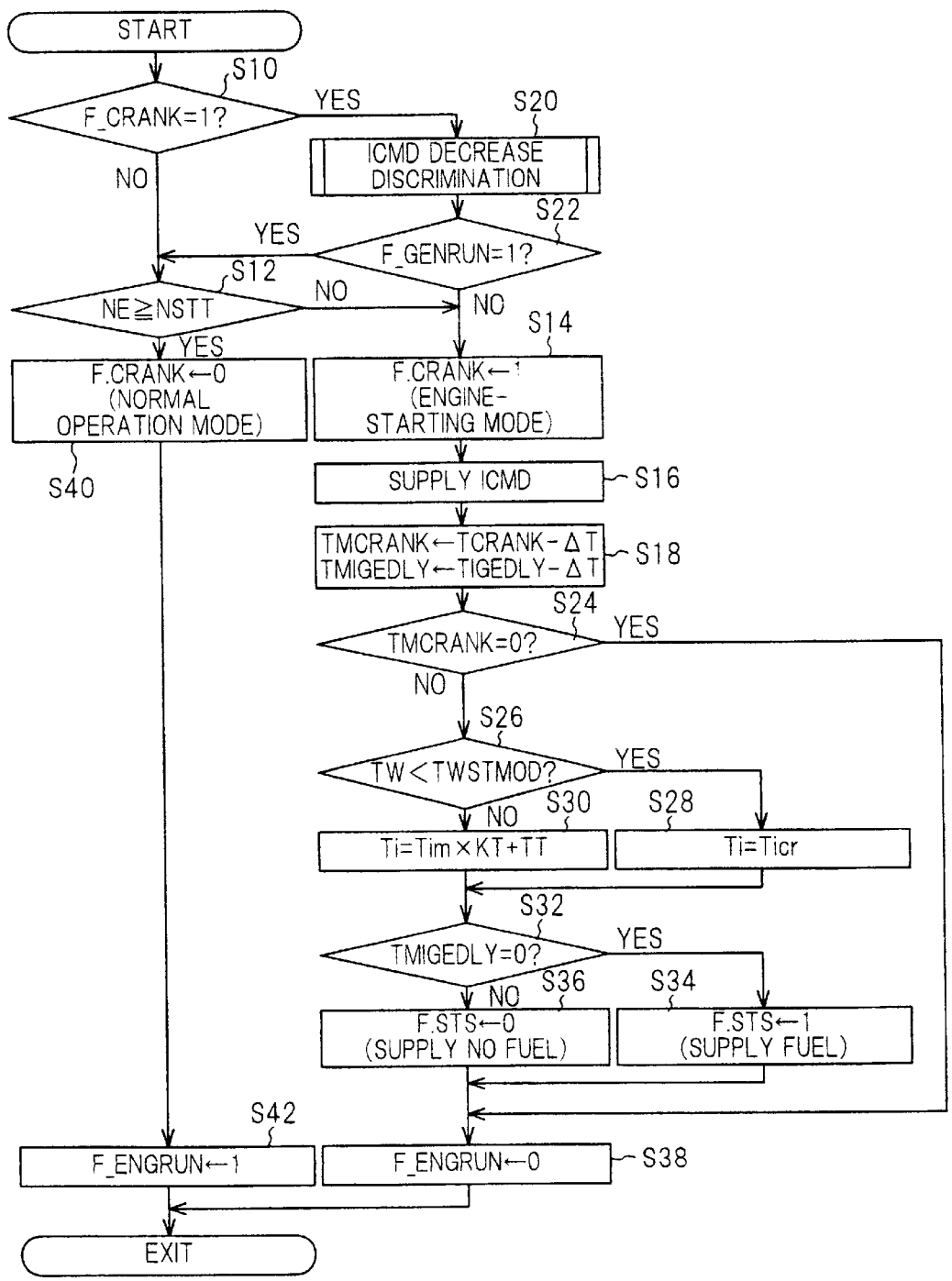
FIG. 2 is a flow chart showing the operation of the system illustrated in FIG. 1.

FIG. 2 is a flow chart showing the operation of the system. The program according to this flow chart is executed at prescribed intervals of, for example, 10 msec.

The program proceeds in S10 in which it is checked whether the bit of a flag F.CRANK is set to 1. Since the bit of the flag is initially set to 1, the result is normally negative in the first program loop, and the program proceeds to S12 in which it is determined whether the detected engine speed NE is greater or equal to a combustion-completion-discrimination engine speed NSTT (e.g., 750 rpm).

The result is normally negative in the first program loop, and the program proceeds to S14 in which the bit of the flag F.CRANK is set to 1. To set the bit of the flag to 1 indicates that the instruction to start the engine 10 is caused to enter engine-starting mode. The program then proceeds to S16 in which the velocity feedback control is begun. Specifically, the current supply to the first generator-motor is started based on the current command ICMD (determined in the manner mentioned above) to rotate the engine 10 such that the engine speed NE converges to the aforesaid desired engine-starting speed NSTS. Thus, the velocity feedback.

Figure 6:
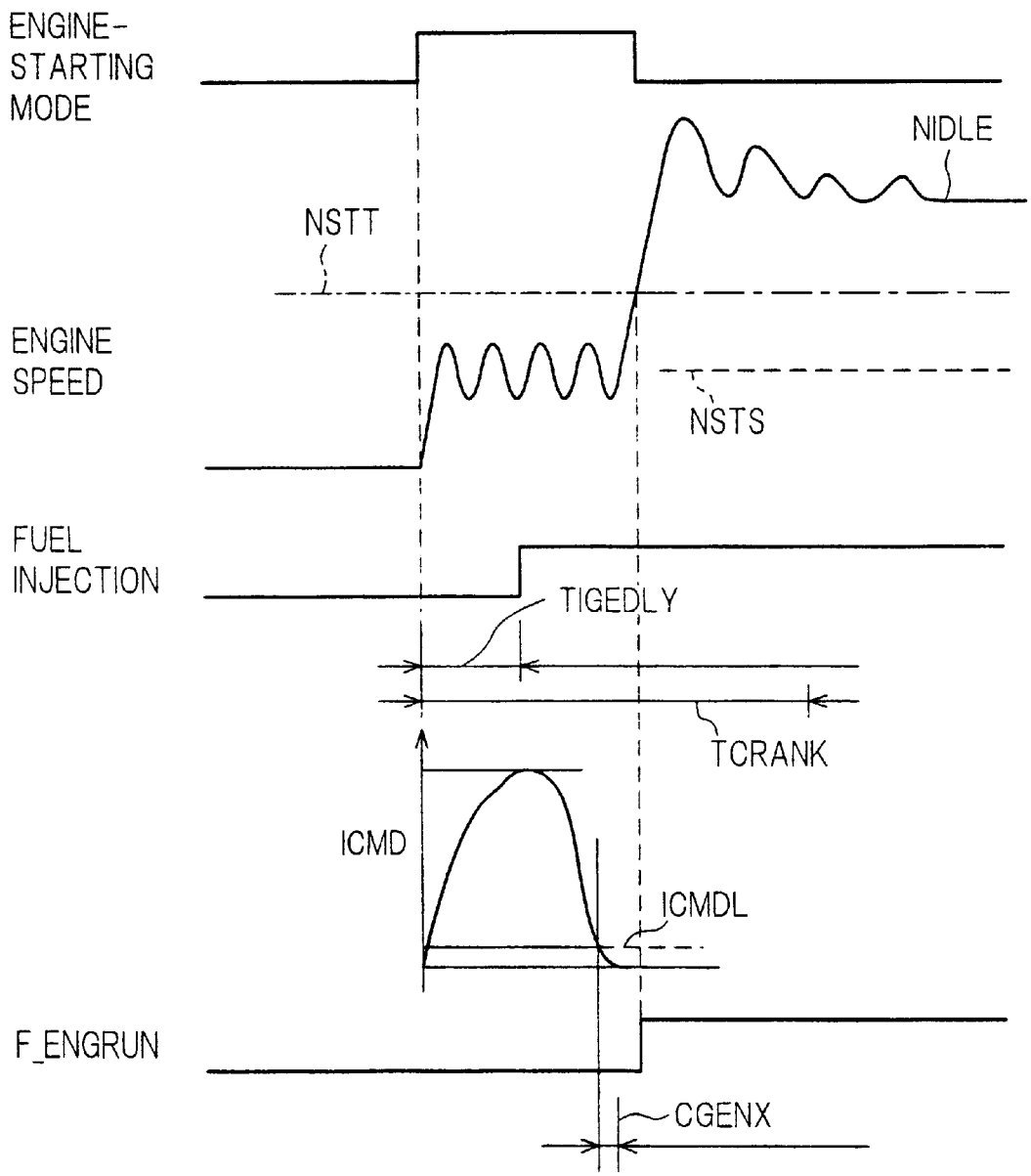
FIG. 6 is a time chart showing the discrimination illustrated in the flow chart of FIG. 2.

At the same time, only in the first program loop, a predetermined first value TCRANK is set to a first timer (down-counter) TMCRANK, and a predetermined second value TIGEDLY is set to a second timer (down-counter) TMIGEDLY. As shown in FIG. 6 which will later be referred to, the predetermined value TCRANK is value defining a time normally necessary for starting the engine 10. The predetermined second value TIGEDLY is a value defining a time to delay the fuel supply after the current is begun and is set to be less than the first value TCRANK, as illustrated in FIG. 6.

The program then proceeds to S18 in which a prescribed minute amount ΔT is subtracted from the values of the first timer TMCRANK and the second timer TMIGEDLY respectively to start measurement of time lapse.

Figure 3:
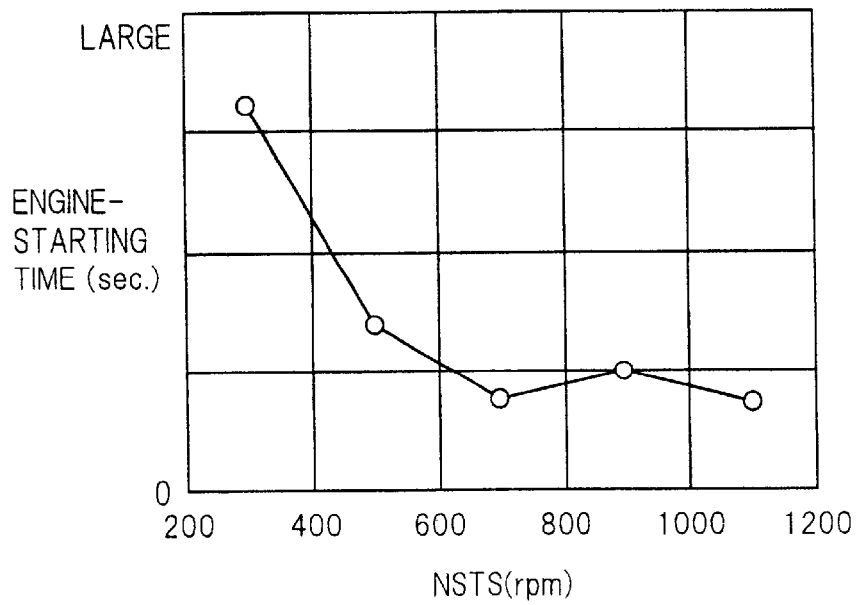
FIG. 3 is an explanatory graph showing how a desired engine-starting speed NSTS is determined which is referred to in the flow chart of FIG. 2.

Explaining the aforesaid desired engine-starting speed NSTS and the combustion-completion-discrimination engine speed NSTT, the inventors noted that, in the series hybrid vehicle in this embodiment, as shown in FIG. 3, the engine-startabilty is enhanced, i.e., the engine-starting time (a time for completing engine starting) decreases with increasing desired engine-starting speed NSTS, but it saturates at approximately 700 rpm of the desired engine-starting speed NSTS. Since the first generator-motor 22 can produce approximately the same output as the engine 10, it is possible to raise the desired engine-starting speed NSTS. However, if the speed NSTS is raised excessively, it will be difficult to distinguish the speed NSTS from an engine idling speed NIDLE, delaying the engine-starting discrimination.

Taking the above into account, the desired engine-starting speed NSTS is set at 700 rpm. Thus, the desired engine-starting speed NSTS is determined to be the point where, with respect to a time for completing engine starting, which has a tendency to decrease with increasing desired engine-starting speed, a further increase in desired engine-starting speed results in no further decrease in the time for completing engine starting. Since the idling speed NIDLE of the engine 10 is approximately 800 rpm in this embodiment, the combustion-completion-discrimination engine speed NSTT is therefore set at 750 rpm in between NSTS and NIDLE.

Returning to the explanation of FIG. 2, the result in S10 is affirmative in the next program loop and the program proceeds to S20 in which it is discriminated whether the current command value ICMD decreases.

Figure 4:
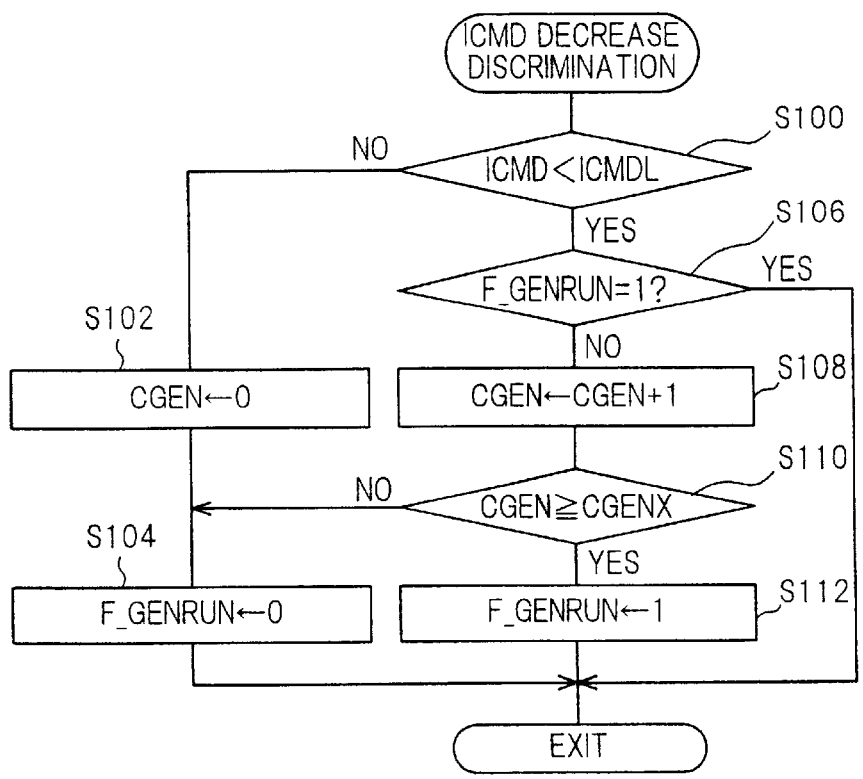
FIG. 4 is a flow chart showing the subroutine of current command decrease discrimination referred to in the flow chart of FIG. 2.

FIG. 4 is a flow chart showing the subroutine for the ICMD decrease discrimination.

The program begins in S100 in which it is determined whether the current command value ICMD (supplied to the first generator-motor 22) is less than a reference value ICMDL.

Figure 5:
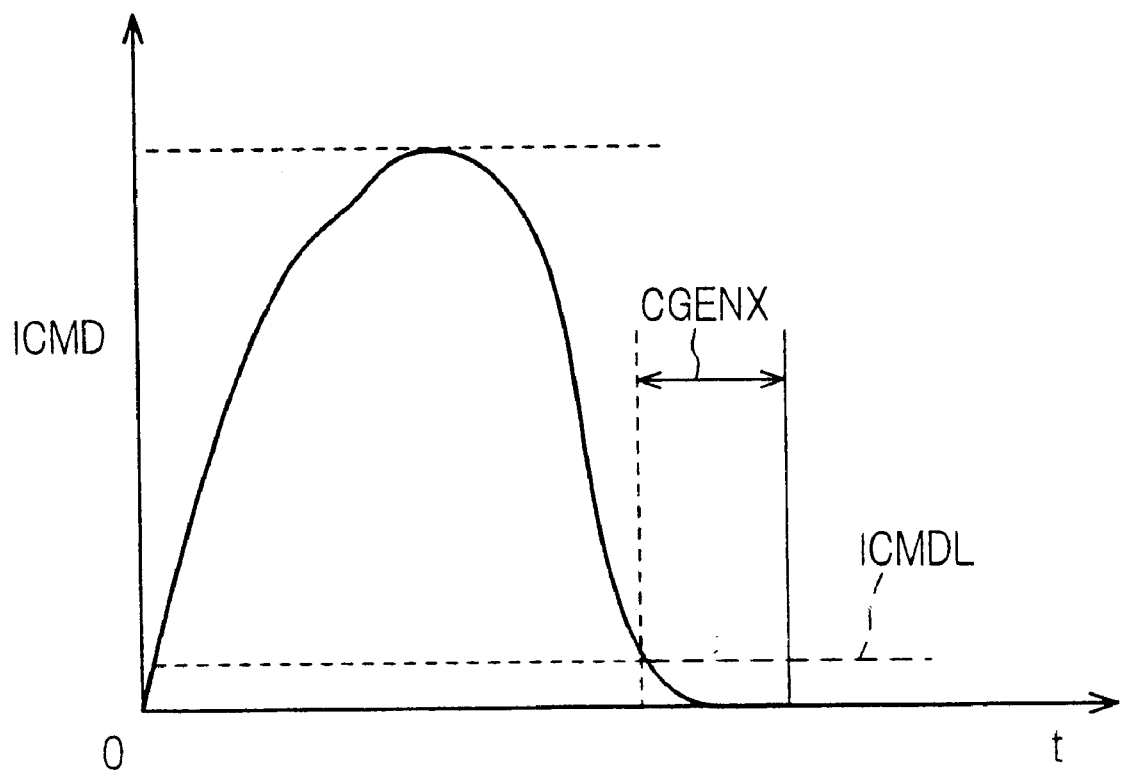
FIG. 5 is a time chart showing the discrimination illustrated in the flow chart of FIG. 4.

Before continuing the explanation of the figure, the engine-starting discrimination according to this embodiment is explained with reference to FIG. 5.

The current command value supplied to the generator-motor 22 is not proportional to the motor speed, as is experienced in ordinary electric motors. And, since the generator-motor 22 is feedback controlled in this embodiment such that the speed of the engine 10 (directly connected to the generator-motor 22) converges to the desired engine-starting speed NSTS, the necessary torque decreases with increasing engine speed. Accordingly, as shown in FIG. 5, the current command ICMD increases gradually with respect to time, then turns in the decreasing direction towards zero and becomes less than the reference value ICMDL set at zero or thereabout.

Accordingly, it becomes possible to discriminate whether the engine speed has reached the desired engine-starting speed NSTS by determining if the current command value ICMD (in the feedback control) becomes less than the reference value ICMDL. The check in S100 therefore amounts to this discrimination. It should be noted here that the reason why the reference value ICMDL is set at zero or thereabout is that the current command value ICMD does not always drop to zero due to noise or some similar factors.

When the result in S100 is negative, the program proceeds to S102 in which a counter (up-counter) CGEN is reset to 0, and to S104 in which the bit of a flag F.GENRUN (explained later) is reset to 0. On the other hand, when the result in S100 is affirmative, since this indicates that the engine speed has reached the desired engine-starting speed NSTS, the program proceeds to S106 in which it is determined whether the bit of the flag F.GENRUN is set to 1.

When the result in S106 is affirmative, the program is immediately terminated. On the contrary, when the result in S106 is negative, the program proceeds to S108 in which the value of the counter CGEN is incremented by 1, and to S100 in which it is determined whether the value of the counter CGEN is greater or equal to a predetermined value CGENX. Since the program of FIG. 2 is executed at the intervals of 10 msec., the check in S110 amounts to determining whether the number of program loops is greater or equal to 10, in other words, whether the time of 100 msec. has elapsed since the current command value ICMD became less than the reference value ICMDL.

When the result in S110 is negative, the program proceeds to S104. On the other hand, when the result in S110 is affirmative, the program proceeds to S112 in which the bit of the flag F.GENRUN is set to 1. To set the bit of the flag F.GENRUN to 1 indicates that the engine speed has reached the desired engine-starting speed NSTS.

Returning to the flow chart of FIG. 2, the program proceeds to S22 in which it is determined whether the bit of the flag F.GENRUN is set to 1, in other words, it is checked if the time lapse after the engine speed reached the desired engine-starting speed NSTS becomes the predetermined value CGENX.

When the result in S22 is negative, the program proceeds, S24, via S14, S16 and S18, to S24 in which it is determined whether the value of the first timer TMCRANK has reached zero. As mentioned above, the counter value is decremented by the prescribed minute amount ΔT each time the program loops S18. The fact that the timer value has reached zero indicates that the time TCRANK necessary for engine-starting counted from the beginning of current supply, i.e., the beginning of cranking has lapsed.

The result in S24 will normally be negative and the program proceeds to S26 in which it is determined whether the detected engine coolant temperature TW is less than a predetermined temperature TWSTMOD (e.g., 25° C.). When the result is affirmative, since this indicating is that the engine 10 is under cold-starting, the program proceeds to S28 in which a fuel injection amount Ti (expressed in injector's valve-opening time) is determined to be a value Ticr (fuel injection amount with engine-starting-increase).

On the other hand, when the result in S26 is negative, since this indicates that the engine 10 is under hot-starting, the program proceeds to S30 in which the fuel injection amount Ti is determined to be as:

$$Ti=Tim \times KT+TT$$

In the above, Tim: a basic fuel injection amount obtained by map retrieval by the engine speed NE and the manifold absolute pressure PBA; KT: the product of various multiplicative correction factors; TT: the sum of various additive correction factors. The fuel injection amount determined in S30 corresponds to that under normal engine operation, i.e., the fuel injection amount after the engine warmup has been finished.

This is because the engine 10 is operated intermittently in such way that it is operated in the high-load region where fuel consumption is good and is stopped in the low-load region. Therefore, the engine 10 may sometimes be hot-started in a relatively short period after being stopped, and in such a situation, it is possible to start the engine 10 by supplying to the engine, immediately upon restart, the same amount of fuel injection as was being supplied just prior to the engine being stopped. Accordingly, the fuel injection amount is thus determined or varied depending upon the engine coolant temperature. With this, the engine startability is enhanced by appropriately supplying the fuel injection amount as required by the engine 10. In addition, when the engine coolant temperature TW is relatively high, the engine 10 is immediately supplied with the same fuel injection amount as that after warmup, i.e., the amount without engine-starting increase. This improves fuel consumption.

Since the gist of the present invention does not reside in the fuel injection control, no further explanation will be made.

In the flow chart of FIG. 2, the program then proceeds to S32 in which it is determined whether the value of the second timer TMIGEDLY has reached zero, in other words, it is checked if the predetermined (second) timer TIGEDLY has elapsed and if the result is affirmative, the program proceeds to S34 in which the bit of a flag F.STS is set to 1. With this, the supply of fuel is conducted in a routine (not shown) based on the fuel injection amount determined in S28 or S30.

FIG. 6 is a time chart showing the engine-starting discrimination according to this embodiment of the invention.

As illustrated in the figure, the supply of fuel is started after the predetermined time TIGEDLY has elapsed since the beginning of supply of primary current to the first generator-motor 22. Since the output of the first generator-motor 22 is relatively large, the supply of fuel is thus delayed, expecting that the engine speed will rise to a considerable extent by the motor torque assistance, thereby improving fuel consumption and emission.

When the result in S32 is negative, the program proceeds to S36 in which the bit of the flag is reset to zero. With this, the supply of fuel is not conducted or permitted in the other routine. The program then proceeds to S38 in which the bit of a flag F.ENGRUN is reset to zero to indicate that the engine 10 has not been started.

On the other hand, when the result in S22 is affirmative, the program proceeds to S12 in which it is determined whether the detected engine speed NE is greater or equal to the combustion-completion-discrimination engine speed NSTT. When the result is negative, the program proceeds to S14 and on. When the result is affirmative, the program proceeds to S40 in which the bit of the flag F.CRANK is reset to 0 to indicate that the engine operation moves from the engine-starting mode to a normal operation mode.

The program then proceeds to S42 in which the bit of the flag F.ENGRUN is set to 1 to indicate that it is discriminated that the starting of the engine 10 has been completed.

When the result in S24 is affirmative, the engine 10 will again be cranked after expiration of an appropriate time. Since this indicates that the engine 10 could not be started during the time TCRANK (set as a time usually necessary for engine starting), it can be considered that there may be a problem in the engine 10. Therefore, this fact may preferably be alerted to the vehicle operator through a visual or audible indicator.

This embodiment is thus configured to have a system for discriminating engine-starting of a hybrid vehicle having an internal combustion engine 10 and a generator-motor 22 connected to the engine to rotate the engine to start and to be rotated to generate electric power after the engine is started, comprising; engine speed detecting means (crank angle sensor 52, ECU 70) for detecting a speed of the engine NE; current command value determining means (ECU 70, S16) for determining a current command value ICMD necessary for rotating the engine at a desired engine-starting speed NSTS in response to an engine-starting instruction (S14) and for beginning supply of current based on the determined current command value to the generator-motor; fuel supply means (ECU 70, S26–S36) for supplying fuel (fuel injection amount Ti) to the engine; time measuring means (ECU 70, S20, 100–S112) for measuring elapse of time (counter value CGEN) after the current command value supplied to the generator-motor became less than a reference value ICMDL; combustion-completion determining means (ECU 70, S22, S12) for determining whether the detected engine speed NE is greater or equal to a combustion-completion discriminating speed NSTT after the measured time (counter value CGEN) has reached a predetermined value CGENX; and engine-starting discriminating means (ECU 70, S12, S42) for discriminating that the engine is started when the detected engine speed is determined to be greater or equal to the combustion-completion engine speed.

With this, the engine starting can definitely be discriminated in a relatively short period with highly accuracy.

In the system, the fuel supply means includes: engine coolant temperature detecting means for detecting an engine coolant temperature of the engine TW (coolant temperature sensor 56, ECU 70); and determines an amount of the fuel to be supplied to the engine based on the detected engine coolant temperature (ECU 70, S26–S30).

The fuel injection amount is thus determined or varied depending upon the engine coolant temperature. With this, the engine startability is enhanced by appropriately supplying the fuel injection amount just required by the engine 10. In addition, when the engine coolant temperature TW is relatively high, the engine 10 is immediately supplied with the same fuel injection amount as that after warmup, i.e., the amount without engine-starting increase. This improves fuel consumption and emission.

In the system, the fuel supply means includes: second time measuring means (ECU 70, S16, S18, second timer TMIGEDLY) for measuring elapse of second time after the supply of current has began; and starts supply of fuel when the measured second time has reached a second value TIGEDLY. With this, the supply of fuel is delayed and fuel consumption and emission is improved.

In the system, the desired engine-starting speed is set at a speed less than an idling speed of the engine.

In the system, the combustion-completion engine speed is set at a speed in between the desired engine-starting speed and the idling speed of the engine NIDLE.

In the system, the desired engine-starting speed is determined to be the point where, with respect to a time for completing engine starting, which has a tendency to decrease with increasing desired engine-starting speed, a further increase in desired engine-starting speed results in no further decrease in the time for completing engine starting, as shown in FIG. 3.

Although the command value to be supplied to the first generator-motor 22 is defined in terms of the current, it may be defined in terms of torque.

Although the value CGENX is defined in terms of the number of program loops, it may be defined in terms of absolute time.

Although the invention has been explained with reference to a series hybrid vehicle, it can also be applied to a parallel hybrid vehicle. Moreover, the invention can also be applied to any vehicle other than the hybrid one having an electric motor for starting the internal combustion engine.

While the invention has thus been shown and described with reference to specific embodiments, it should be noted that the invention is in no way limited to the details of the described arrangements but changes and modifications may be made without departing from the scope of the appended claims.

What is claimed is:

1. A system for discriminating engine-starting of a hybrid vehicle having an internal combustion engine and a generator-motor connected to the engine to rotate the engine to start and to be rotated to generate electric power after the engine is started, comprising;

engine speed detecting means for detecting a speed of the engine;

current command value determining means for determining a current command value necessary for rotating the engine at a desired engine-starting speed in response to an engine-starting instruction and for beginning supply of current based on the determined current command value to the generator-motor;

fuel supply means for supplying fuel to the engine;

time measuring means for measuring elapse of time after the current command value supplied to the generator-motor has become less than a reference value;

combustion-completion determining means for determining whether the detected engine speed is greater or equal to a combustion-completion discriminating speed after the measured time has reached a predetermined value; and engine-starting discriminating means for discriminating that the engine is started when the detected engine speed is determined to be greater or equal to the combustion-completion engine speed.

2. A system according to claim 1, wherein the fuel supply means includes:

engine coolant temperature detecting means for detecting an engine coolant temperature of the engine;

and determines an amount of the fuel to be supplied to the engine based on the detected engine coolant temperature.

3. A system according to claim 1, wherein the fuel supply means includes:

second time measuring means for measuring elapse of second time after the supply of current has began;

and starts supply of fuel when the measured second time has reached a second value.

4. A system according to claim 1, wherein the desired engine-starting speed is set at a speed less than an idling speed of the engine.

5. A system according to claim 4, wherein the combustion-completion engine speed is set at a speed in between the desired engine-starting speed and the idling speed of the engine.

6. A system according to claim 4, wherein the desired engine-starting speed is determined to be a point where, with respect to a time for completing engine starting, which has a tendency to decrease with increasing desired engine-starting speed, a further increase in desired engine-starting speed results in no further decrease in the time for completing engine starting.

7. A method of discriminating engine-starting of a hybrid vehicle having an internal combustion engine and a generator-motor connected to the engine to rotate the engine to start and to be rotated to generate electric power after the engine is started, comprising the steps of;

detecting a speed of the engine;

determining a current command value necessary for rotating the engine at a desired engine-starting speed in response to an engine-starting instruction and for beginning supply of current based on the determined current command value to the generator-motor;

supplying fuel to the engine;

measuring elapse of time after the current command value supplied to the generator-motor became less than a reference value;

determining whether the detected engine speed is greater or equal to a combustion-completion discriminating speed after the measured time has reached a predetermined value; and discriminating that the engine is started when the detected engine speed is determined to be greater or equal to the combustion-completion engine speed.

8. A method according to claim 7, wherein the step of fuel supply includes the steps of:

detecting an engine coolant temperature of the engine; and determining an amount of the fuel to be supplied to the engine based on the detected engine coolant temperature.

9. A method according to claim 7, wherein the step of fuel supply includes the steps of:

measuring elapse of second time after the supply of current has began; and starting supply of fuel when the measured second time has reached a second value.

10. A method according to claim 7, wherein the desired engine-starting speed is set at a speed less than an idling speed of the engine.

11. A method according to claim 10, wherein the combustion-completion engine speed is set at a speed in between the desired engine-starting speed and the idling speed of the engine.

12. A method according to claim 10, the desired engine-starting speed is determined to be a point where, with respect to a time for completing engine starting, which has a tendency to decrease with increasing desired engine-starting speed, a further increase in desired engine-starting speed results in no further decrease in the time for completing engine starting.

* * * * *